T. PURCELL.
CUSHION TIRE.
APPLICATION FILED JULY 15, 1909.

969,077.

Patented Aug. 30, 1910.

Witnesses
William C. Linton
C. C. Hines

Inventor
Thomas Purcell
By Victor J. Evans
Attorney

UNITED STATES PATENT OFFICE.

THOMAS PURCELL, OF ROANOKE, VIRGINIA.

CUSHION-TIRE.

969,077.  Specification of Letters Patent.  Patented Aug. 30, 1910.

Application filed July 15, 1909. Serial No. 507,831.

*To all whom it may concern:*

Be it known that I, THOMAS PURCELL, a citizen of the United States, residing at Roanoke, in the county of Roanoke and State of Virginia, have invented new and useful Improvements in Cushion-Tires, of which the following is a specification.

This invention relates to cushion tires for automobile and other vehicle wheels, the object of the invention being to provide a tire which, while being free from liability of puncture, will give the desired elastic or cushioning effect, and which is composed of sections detachably mounted upon the wheel and rim in such a manner as to permit of the ready removal of a worn or injured section and the substitution of a new section therefor.

The invention consists of the features of construction, combination and arrangement of parts hereinafter fully described and claimed, reference being had to the accompanying drawings, in which:—

Figure 1:
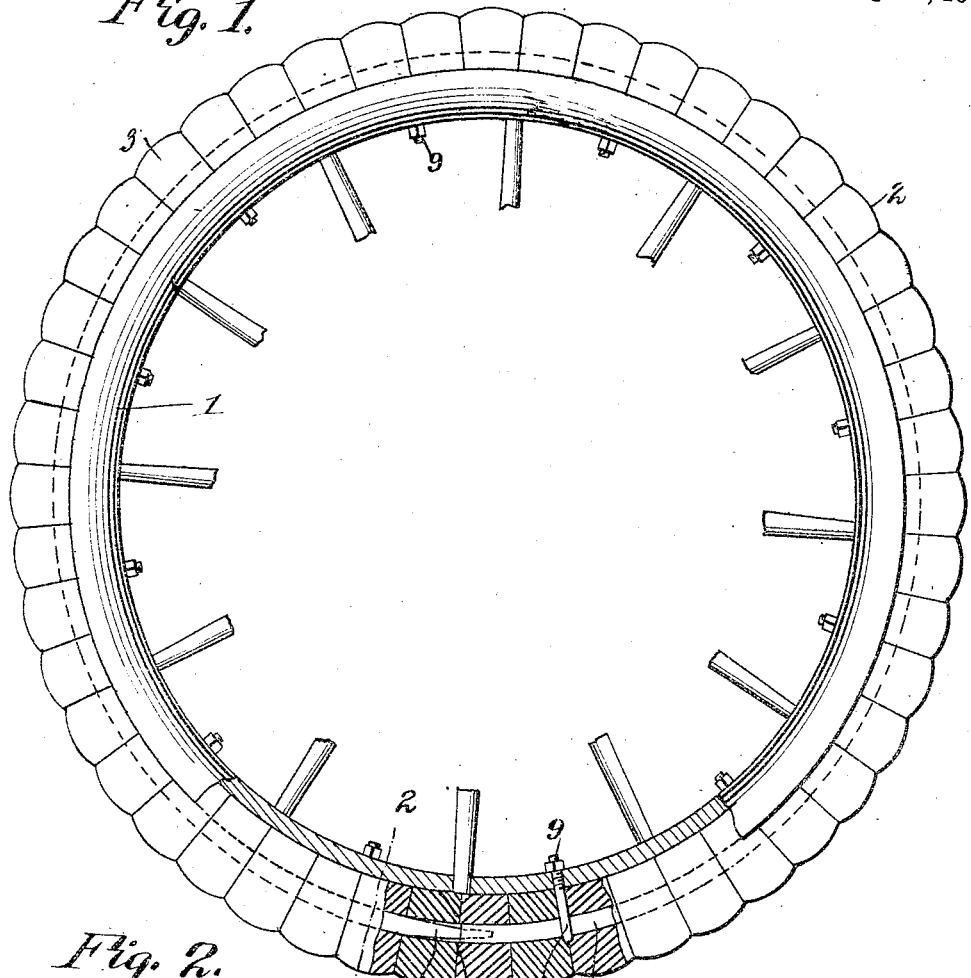
Figure 2:
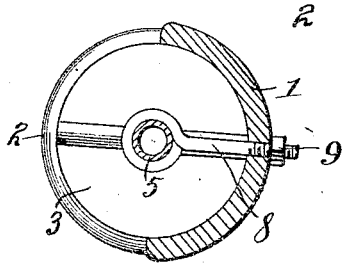
Figure 3:
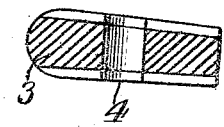

Figure 1 is a side elevation, partially in section, of a vehicle wheel and tire embodying my invention. Fig. 2 is a cross section on the line 2—2 of Fig. 1. Fig. 3 is a sectional view of one of the blocks or sections of the tire.

Referring to the drawing, 1 designates the wheel rim or felly, which is of channeled form and may be made of wood, metal or other suitable material. The tire 2 is composed of an annular series of blocks 3, each composed of rubber or other desired elastic material possessing the requisite amount of resiliency. Each of these blocks is co-extensive in width with the channel and formed to fit within the same, said blocks being tapered outwardly or segmentally shaped so as to provide for their proper aggroupment to form a circular tire within and around the wheel rim.

The blocks are provided with alining openings for the passage of a holding band or core 5 by which they are fastened in position upon the wheel rim. This band or core preferably consists of a flexible metallic tube, although it may be made of other suitable material, one end of said tube being longitudinally tapered, as shown at 6, to fit within the other end 7 thereof, by which an effective form of joint between the ends is formed.

At desired intervals circumferentially of the rim, the core 5 is connected thereto by coupling members 8, each preferably consisting of an eye bolt having its eye engaged with the core 5 and the threaded portion of this shank extending radially inward through an opening in the rim and fastened thereto against outward displacement by a nut 9. For the accommodation of this bolt, the meeting faces of the adjacent tire sections or blocks 3 may be grooved, if desired, so as to prevent undue compression thereof.

It will be understood from the foregoing description that a tire composed of a series of elastic blocks of the construction described will be sufficiently resilient to absorb the shocks and jars resulting from the passage of the wheels over uneven surfaces, while it is not susceptible of puncture or like injury such as pneumatic tires are subject to, whereby the efficiency of the tire is impaired. It will further be seen that the blocks are removably mounted upon the wheel so that they cannot become accidentally displaced, while by simply removing certain of the nuts confining the eye bolts adjacent the meeting ends of the core, the latter may be disconnected and any contiguous blocks removed and others substituted therefor, or by detaching a greater or lesser number of the eye bolts, as occasion may require, the core may be freed for any distance from its ends so that the blocks may be slipped off and others applied in their place. Repairs may thus be easily and conveniently made within a minimum amount of time.

Having thus described the invention what is claimed as new is:—

A vehicle wheel comprising a channeled rim, a tire composed of a series of resilient segmental blocks, the meeting faces of some of said blocks at spaced intervals around the rim being provided with grooved opposing faces, a tubular core extending through and connecting the blocks, one end of said core being expanded to conical form and the other reduced to tapered form to telescope within the same, eye-bolts arranged between the faces of the grooved blocks and seated within the grooves to permit the faces to snugly abut, said bolts extending radially between said blocks and having their eyes engaging the tubular core and their threaded shanks extending inwardly through the rim, and nuts on said shanks fastening the bolts to the rim.

In testimony whereof I affix my signature in presence of two witnesses.

THOMAS PURCELL.

Witnesses:
R. H. ANGELL.
G. R. PARIS.